(12) United States Patent
Stiesdal

(10) Patent No.: US 9,200,620 B2
(45) Date of Patent: Dec. 1, 2015

(54) JACKET STRUCTURE FOR OFFSHORE CONSTRUCTIONS

(75) Inventor: Henrik Stiesdal, Odense C. (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 413 days.

(21) Appl. No.: 13/695,444

(22) PCT Filed: Sep. 15, 2010

(86) PCT No.: PCT/EP2010/063551
§ 371 (c)(1),
(2), (4) Date: Oct. 31, 2012

(87) PCT Pub. No.: WO2011/147475
PCT Pub. Date: Dec. 1, 2011

(65) Prior Publication Data
US 2013/0177445 A1  Jul. 11, 2013

(30) Foreign Application Priority Data
May 25, 2010 (EP) .................................... 10163750

(51) Int. Cl.
*F03D 11/04* (2006.01)
*E04H 12/08* (2006.01)
*E02D 27/42* (2006.01)
*F16B 7/18* (2006.01)

(52) U.S. Cl.
CPC ................ *F03D 11/04* (2013.01); *E02D 27/42* (2013.01); *E04H 12/08* (2013.01); *F05B 2260/301* (2013.01); *F16B 7/18* (2013.01)

(58) Field of Classification Search
CPC . F03D 11/04; F03D 11/045; F05B 2260/301; E04H 12/08; E04H 12/085
USPC .......................................................... 416/244
See application file for complete search history.

(56) References Cited

U.S. PATENT DOCUMENTS

| | | | | |
|---|---|---|---|---|
| 3,564,783 | A * | 2/1971 | Dunne | 52/38 |
| 4,403,916 | A * | 9/1983 | Skelskey | 416/14 |
| 5,806,262 | A | 9/1998 | Nagle | |
| 7,198,453 | B2 * | 4/2007 | Hall | 415/4.3 |
| 7,530,780 | B2 * | 5/2009 | Kothnur et al. | 415/4.3 |
| 2011/0006538 | A1 * | 1/2011 | Fischer et al. | 290/55 |

FOREIGN PATENT DOCUMENTS

| | | |
|---|---|---|
| CN | 1659348 A | 8/2005 |
| EP | 2065593 A1 | 6/2009 |
| EP | 2067914 A2 | 6/2009 |
| EP | 2192245 A1 | 6/2010 |
| JP | 2003206852 A | 7/2003 |
| WO | WO 2007059768 A1 | 5/2007 |
| WO | WO 2008122827 A2 | 10/2008 |
| WO | WO 2008152101 A1 | 12/2008 |
| WO | WO 2009028092 A1 | 3/2009 |

* cited by examiner

*Primary Examiner* — Ninh H Nguyen

(57) ABSTRACT

Jacket structure for offshore constructions, particularly jacket structure for an offshore wind turbine is disclosed. The jacket structure includes a number of profiles in axial or angled alignment and a number of connecting members. A connection of the profiles and/or the connecting members is established by means of a bolted-connection.

13 Claims, 5 Drawing Sheets

JACKET STRUCTURE FOR OFFSHORE CONSTRUCTIONS

CROSS REFERENCE TO RELATED APPLICATIONS

This application is the US National Stage of International Application No. PCT/EP2010/063551, filed Sep. 15, 2010 and claims the benefit thereof. The International Application claims the benefits of European application No. 10163750.2 EP filed May 25, 2010. All of the applications are incorporated by reference herein in their entirety.

FIELD OF INVENTION

The invention relates to a jacket structure for offshore constructions, particularly a jacket structure for offshore wind turbines, comprising a number of profiles in axial or angled alignment and a number of connecting members.

BACKGROUND OF INVENTION

Offshore constructions for diverse structures to be installed in the sea are usually necessary in particular for wind power plants, that is wind turbines and represent a constructive challenge as the respective structure has to be erected on the seabed by means of an appropriate foundation. A number of different types of foundations such as monopile-, tripile-, tripod- or gravity-foundations for instance are known from prior art.

Aside, jacket structures are well-known since they represent a constructively simple principle having good mechanical properties particularly due to a high stiffness-to-material-use ratio and thus, are adapted to be erected on sites with high wave-loads. Besides, jacket structures are comparatively cost-effective.

EP 2 067 914 A1 discloses a known jacket structure comprising a number of rod-profiles in axial or angled alignment and a number of node-like connecting members, whereby a connection of the rod-profiles and the node-like connecting members is achieved by welding.

SUMMARY OF INVENTION

Yet, welding represents a comparatively complex connecting method for establishing a stable connection of the respective parts of the jacket structure. Aside, the used materials must be weldable, which is deemed as a notable restriction in the selection of possible applicable materials for the jacket structure. Altogether, welded joints for jacket structures are fairly complex in planning and realisation.

Hence, it is the object of the invention to provide a jacket structure for offshore constructions with an improved connecting principle.

This is achieved by a jacket structure for offshore constructions as described above, wherein a connection of the profiles and/or the connecting members is established by means of a bolted-connection.

The present invention emanates from a detachable bolted-connection of the respective profiles and/or connecting members, which contributes to a generally easy and fast erection of the inventive jacket structure. Bolted-connections are well-known and built a constructively simple, yet mechanically stable joint of the profiles and/or connecting members. Thereby, the profiles are usually rod-like components which may be installed in axial or angled alignment and connecting members are usually adapter-like members having an axially extending base-portion and at least one limb-like lug extending in a defined angle off the base-portion. Thus, the concrete design of the connecting member is strongly dependent of the constructive design of the jacket structure. All parts of the jacket structure are built of materials which are capable for the use in offshore-applications and particularly comprise good mechanical and anti-corrosive properties. The connecting members are preferably cast iron-based parts.

Altogether, the inventive jacket structure is easy to mantle, that is can be mantled on the designated site of a region of the offshore construction. Thereby, a high degree of flexibility concerning the constructive design is given particularly regarding number, dimensions, angles, etc. of the profiles and the connecting members respectively. Aside, tolerances may be easily accommodated. Further, load calculations are readily feasible and in terms of maintenance and repair usually a reduced number of inspections concerning weldings or castings which also leads to a reduction of costs is attainable.

The design of the jacket structure is not restricted, that is the profiles may be connected with at least one further profile and/or at least one connecting member. The same applies to the connecting members, which may be connected to at least one profile in axial alignment and/or at least one further profile in an angled alignment and/or at least one further connecting member. Hence, a vast range of different individual designs of the inventive jacket structure is possible.

It is preferred that each profile and each connecting member comprises at least one connecting portion for connecting with at least one further profile and/or connecting member. Respective connecting portions exhibit an essential function in the inventive mechanical joint and may be deemed as the portion where the bolted-connection between a profile and/or a connecting member and a preceding or successive profile and/or connecting member is established. Hence, the constructive design of the jacket structure, that is the profiles and the connecting members brings other respective connecting portions in close contact, so that the bolted-connection is readily feasible.

Thereby, it is of advantage when the connecting portion is provided at respective free endings of the profiles and the connecting members. In such a manner, a fast and easy erection of the jacket structure may be attained.

The free endings of the profiles may be disposed in axial alignment and the free endings of the connecting members are favourably disposed in axial and angled alignment. Hence, the profiles preferably comprise two free endings oriented in axial direction, while the connecting members preferably comprise at least two free endings, that is at least one in axial and at least another in an angled alignment relative to the axial alignment of the profiles which causes the mentioned constructive flexibility concerning diverse designs of the inventive jacket structure.

It is possible that the bolted-connection is provided by bolts at least penetrating through at least two adjacently disposed connecting portions of the profiles and/or the connecting members, whereby the free endings of the bolts are fixed by respective locking means, particularly screw nuts. This embodiment is considered as the basic connecting principle of two adjacently disposed parts, that is profiles and/or connecting members. Screw nuts or the like serve as a proper locking means of the respective bolts at the connecting portions. The bolts may be provided with threads.

Likewise, it is possible that a bolt penetrates from a connecting portion of a first profile or connecting member through at least one connecting portion of at least one further profile and/or connecting member disposed downstream to at least one connecting portion of a further profile and/or connecting member. This embodiment requires long bolts since they must be able to axially penetrate through at least one profile or connecting member respectively, that is the length of the bolt must exceed the entire length of the respective profile or connecting member. In such a manner, in dependence of the length of the bolt, the bolt may penetrate through one or more profiles and/or connecting members. Hence, according to this embodiment a mechanical, that is bolted-connection of a number of profiles and/or connecting members may be achieved using a reduced number of bolts.

Thereby, it is thinkable that the bolt is at least partially enclosed by a sleeve. The sleeve mainly covers or shields the portion of the bolt which extends or penetrates through the profiles and/or connecting members in terms of an additional protection against corrosion for instance. The sleeve may be adhered, shrinked or otherwise stably attached to the respective portion of the bolt.

The connecting portion is provided by at least one radially inwardly and/or outwardly extending flange. Thereby, radially outwardly extending flanges are easily accessible and hence advantageous in terms of establishing the inventive bolted-connection. However, the bolts are exposed to the corrosive atmosphere of the sea. In contrast, radially inwardly extending flanges are not directly exposed to the specific environments or conditions pertaining in offshore constructions, yet the connection may be comparatively complex, so that working personal has to enter the inside of the jacket structure or respective profiles and/or connecting portions so as to built the inventive bolted-connection. The same applies in cases of maintenance or repair of the inventive jacket structure or parts of it. Of course, the connecting portion may comprise both radially inwardly and outwardly extending flanges, which likewise increases the number of possible bolted-connections and further the mechanical stability of the bolted-connection.

It is preferred that each flange comprises at least one bore through which a bolt may penetrate. The bores may be built as openings, apertures, through-holes or the like and are adapted to the dimensions, that is particularly the outer diameter of the respective bolts. The bores may be provided with an inner thread, which may engage with an outer thread provided with the bolts. This further increases the mechanical stability of the inventive bolted-connection.

In a further embodiment of the invention the profile and/or the connecting member is at least partially hollow. In such a manner, the jacket structure or the profiles and/or connecting members respectively may represent a comparatively light-weight construction, which is preferred in terms of transport and handling of the respective parts. In order to increase the mechanical stability, the profiles and/or connecting members may comprise at least partially extending massive portions. If need be, the profiles and/or connecting members may also be built as entirely massive parts.

It is preferred that the profile and/or the connecting member has a round or elliptical cross-section. Round or elliptical cross sections show good mechanical stability due to their geometric shape and may further be readily manufactured. Of course, other cross-sectional shapes such as rectangular or triangular shapes for instance are applicable as well.

Thereby, it is possible that the profile has the same or a different cross-section than the connecting member. The specific design of the cross-section plays a rather subordinate role in the inventive connecting-principle since it is based on adjacently disposed corresponding connecting portions disposed at adjacently aligned profiles and/or connecting members. With the use of different cross-sectional profiles and/or connecting members, a further degree of flexibility regarding the inventive jacket structure may be feasible, since this further supports the possibility of constructing the inventive jacket structure in terms of a construction-kit system.

Aside, the invention relates to a wind turbine comprising a jacket structure as described before.

BRIEF DESCRIPTION OF THE DRAWINGS

In the following the invention is described in detail as reference is made to the figures, whereby.

DETAILED DESCRIPTION OF INVENTION

Figure 1:
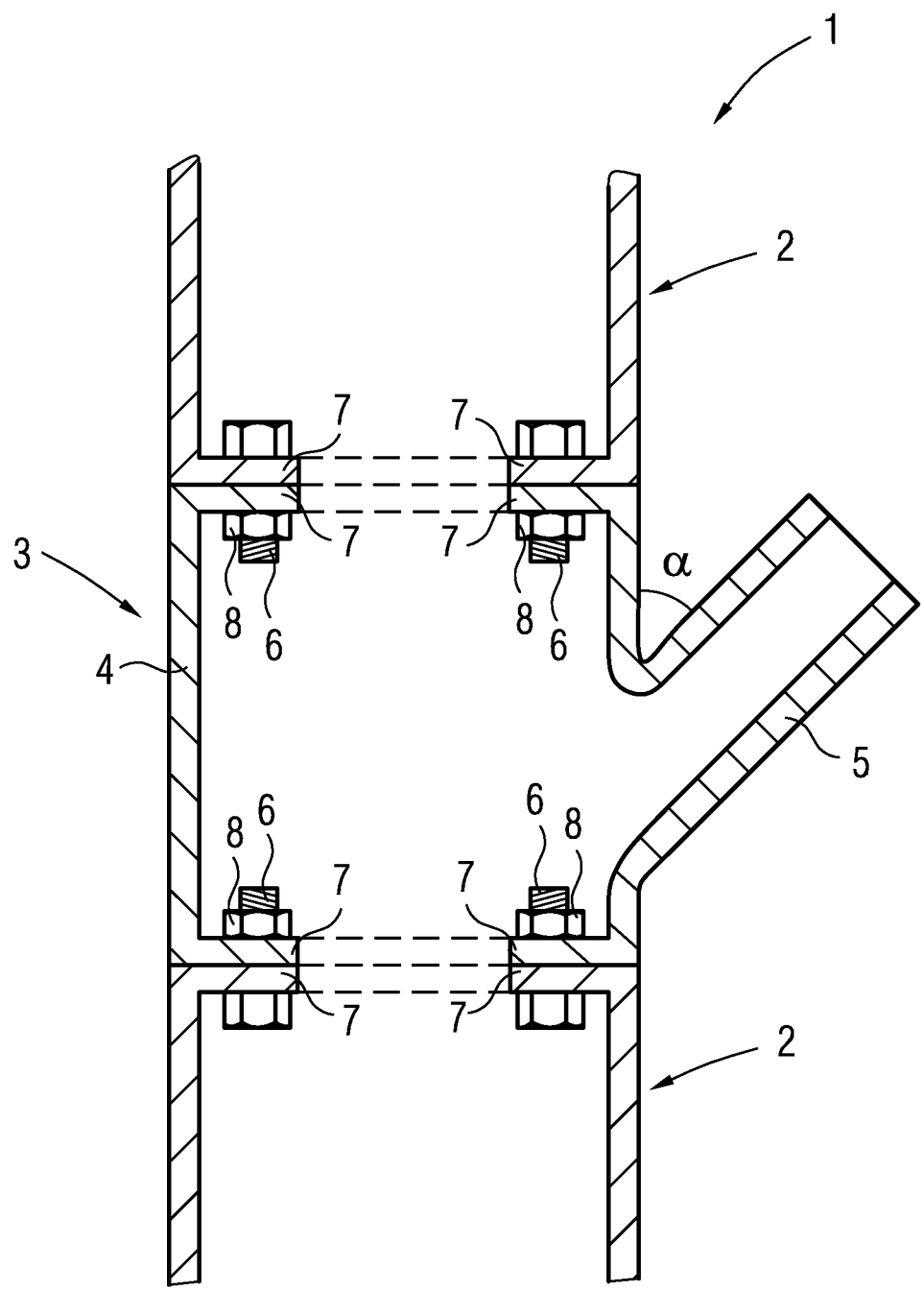
FIG. 1 shows a principle cut-out view of an inventive jacket structure according to a first exemplary embodiment of the invention.

FIG. 1 shows a principle cut-out view of an inventive jacket structure 1 according to a first exemplary embodiment of the invention. The jacket structure 1 comprises a number of axially aligned hollow rod-like profiles 2 and an adapter- or node-like connecting member 3 having an axially aligned hollow basic portion 4 and an integrally built hollow branching 5 extending in an angle a off the basic portion 4. A connection of the jacket structure 1, that is the profiles 2 and the connecting member 3 is provided by a detachable bolted-connection comprising bolts 6 penetrating through respective bores or through-holes at respective connecting portions in the shape of radially inwardly extending flanges 7 provided with the axial free endings of the profiles 2 and the connecting member 3 that is its basic portion 4 respectively. The bolts 6 outer diameter is threaded so that the bolts 6 can be fastened by engaging in correspondingly threaded screw nuts 8. The dashed lines between the radial free ends of the flanges 7 facing each other indicate that the respective free axial endings of the profiles 2 and the connecting members 3 may be closed as well, so that the profiles 2 and the connecting members 3 essentially define a closed axial volume.

As is further discernible, the free ending of the branching 5 of the connecting member 3 does not comprise a respective flange 7, that is a further part such as a further profile 2 in angled alignment with respect to the axially extending profiles 2 could be circumferentially welded to the respective free ending of the branching 5 for instance.

All parts of the jacket structure 1 are made of a mechanically stable material which exhibits outstanding anti-corrosive properties such as stainless steel for instance since the jacket structure 1 favourably represents a foundation of an offshore-wind turbine and thus is regularly disposed under water. Parts to be welded preferably cast-parts, particularly concerning the connecting member 3. Possibly, certain corrosion-inhibiting coatings or varnishes may be applied to the outer surfaces of the profiles 2 and the connecting members 3 respectively.

Both profiles 2 and connecting members 3 comprise a round cross-section, their dimensions particularly concerning outer and inner diameters as well as wall thicknesses are favourably the same.

Figure 2:
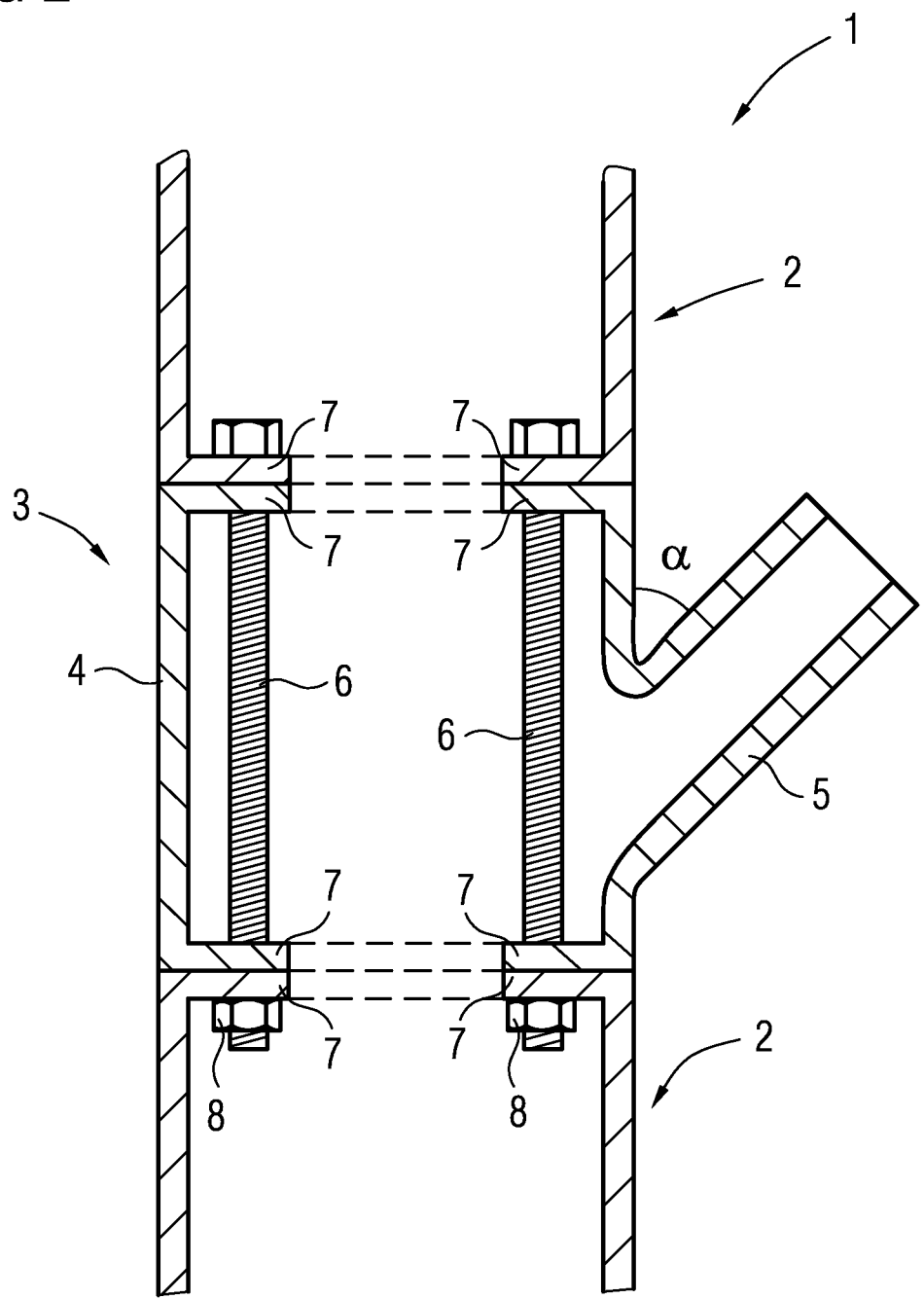
FIG. 2 shows a principle cut-out view of an inventive jacket structure according to a second exemplary embodiment of the invention.
Figure 3:
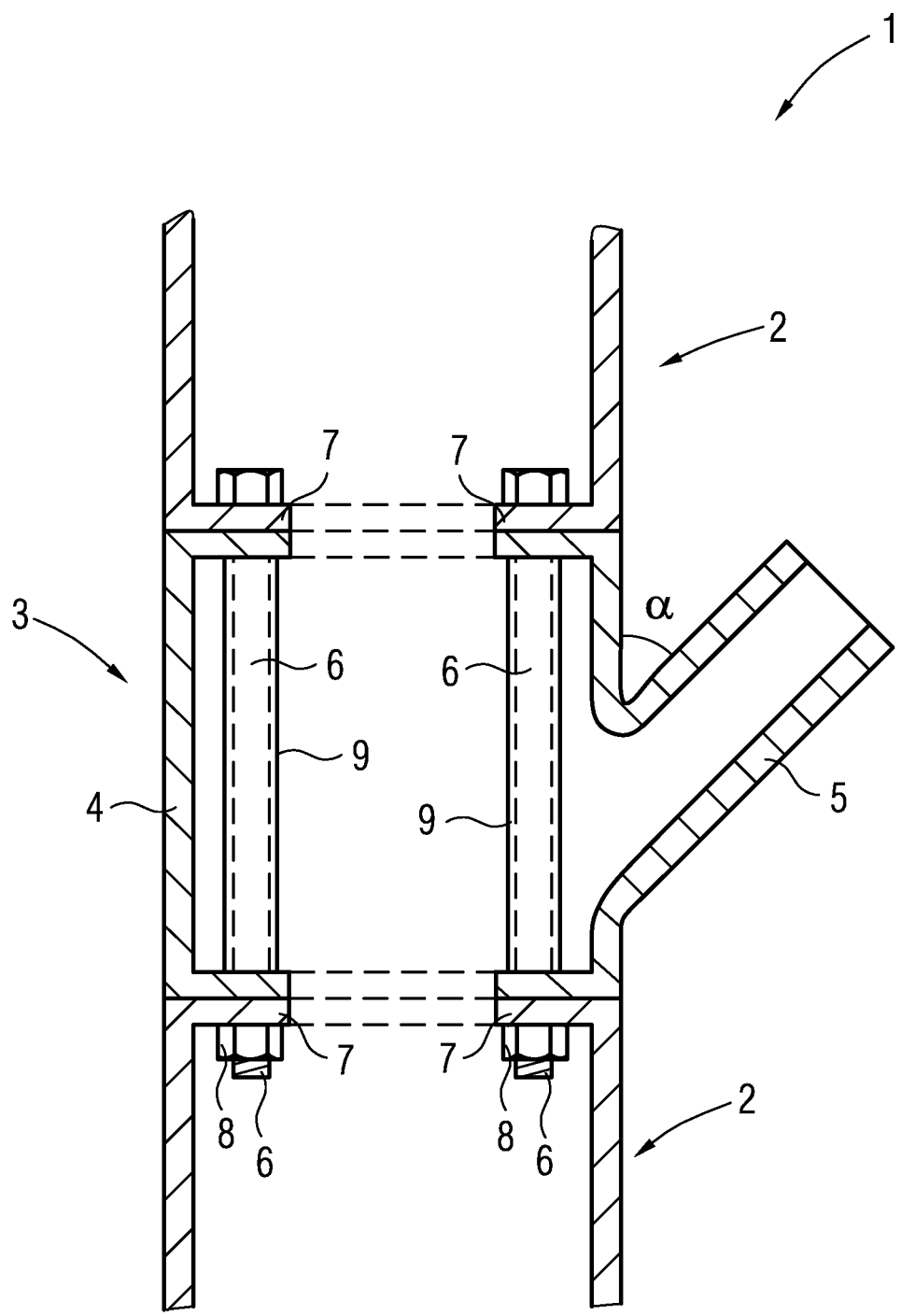
FIG. 3 shows a principle cut-out view of an inventive jacket structure according to a third exemplary embodiment of the invention.

FIG. 2 shows a principle cut-out view of an inventive jacket structure 1 according to a second exemplary embodiment of the invention. The essential difference to the embodiment depicted in FIG. 1 may be seen in the length of the bolts 6 which axially extend from the upper profile 2 through respective bores within the adjacently disposed flanges 7 of the profile 2 and the connecting member 3 through the entire connecting member 3 and further through respective bores provided with adjacently disposed flanges 7 provided with the connecting member 3 and the lower profile 2 into the lower profile 2 where it is fastened by means of screw nuts 8. Thus, the connection of the two profiles 2 and the connecting member 3 requires only two bolts 6 in terms of long bolts 6. Consequently, the number of connecting means, that is bolts 6 and screw nuts 8 may be reduced in such a manner As is discernible from FIG. 3 depicting a principle cut-out view of an inventive jacket structure 1 according to a third exemplary embodiment of the invention, the part of the bolts 6 extending through the connecting member 3 may be surrounded by a sleeve 9. Thereby, the sleeve 9 may act as a corrosion-inhibiting shielding of the respective portions of the bolts 6. The sleeve 9 may be made of a polymer.

Figure 4:
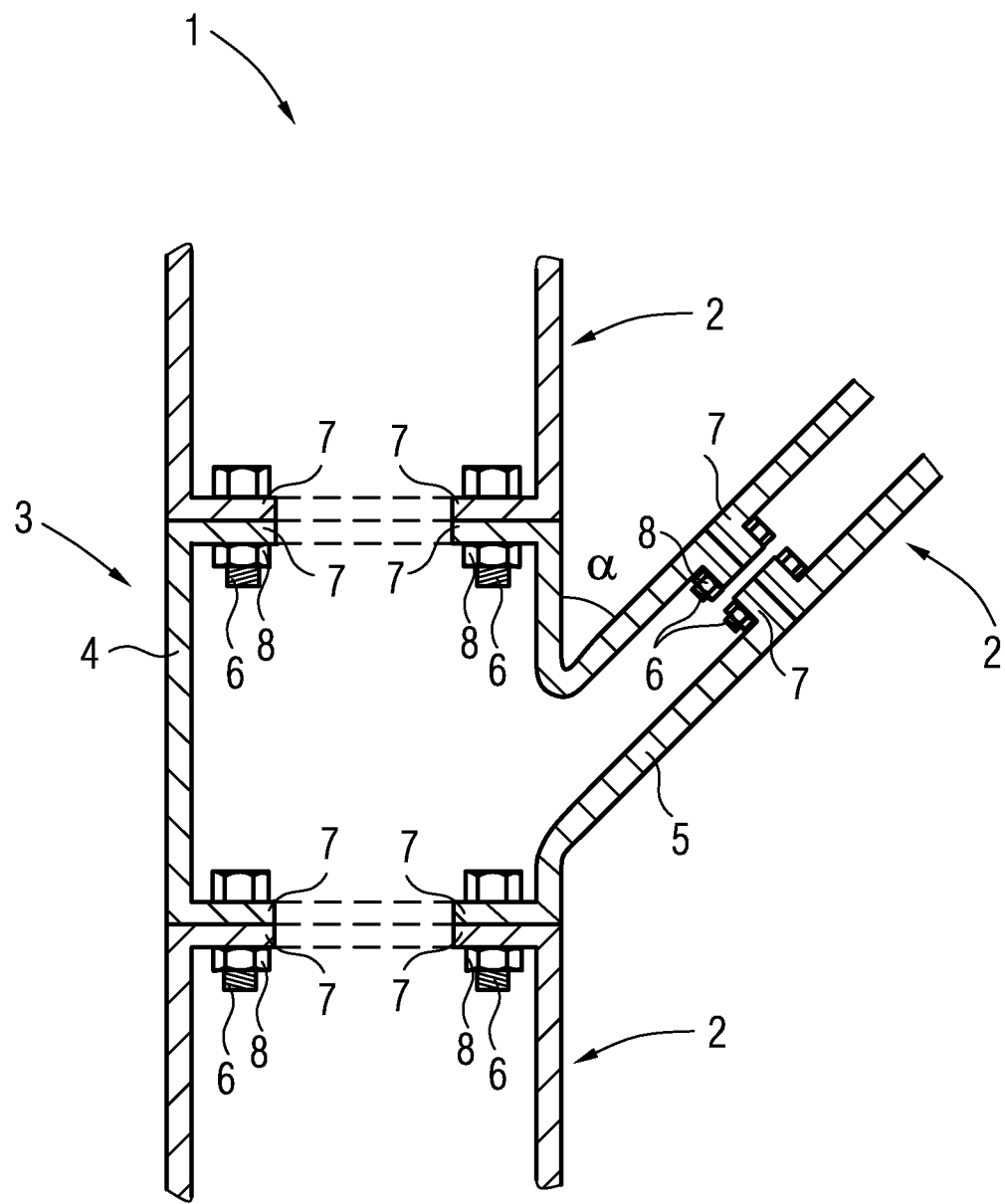
FIG. 4 shows a principle cut-out view of an inventive jacket structure according to a fourth exemplary embodiment of the invention.

As is depicted in FIG. 4 showing a principle cut-out view of a fourth embodiment of the present invention, the respective free ending of the branching 5 of the connecting member 3 may also be provided with a connecting portion in the shape of radially inwardly extending flanges 7. In such a manner, the branching 5 may also be connected with a profile 2 in an angled alignment having respectively formed free endings, that is having corresponding radially inwardly extending flanges 7 comprising bores through which bolts 6 may penetrate in order to establish a bolted-connection of the connecting member 3 and the profile 2 in angled alignment.

Figure 5:
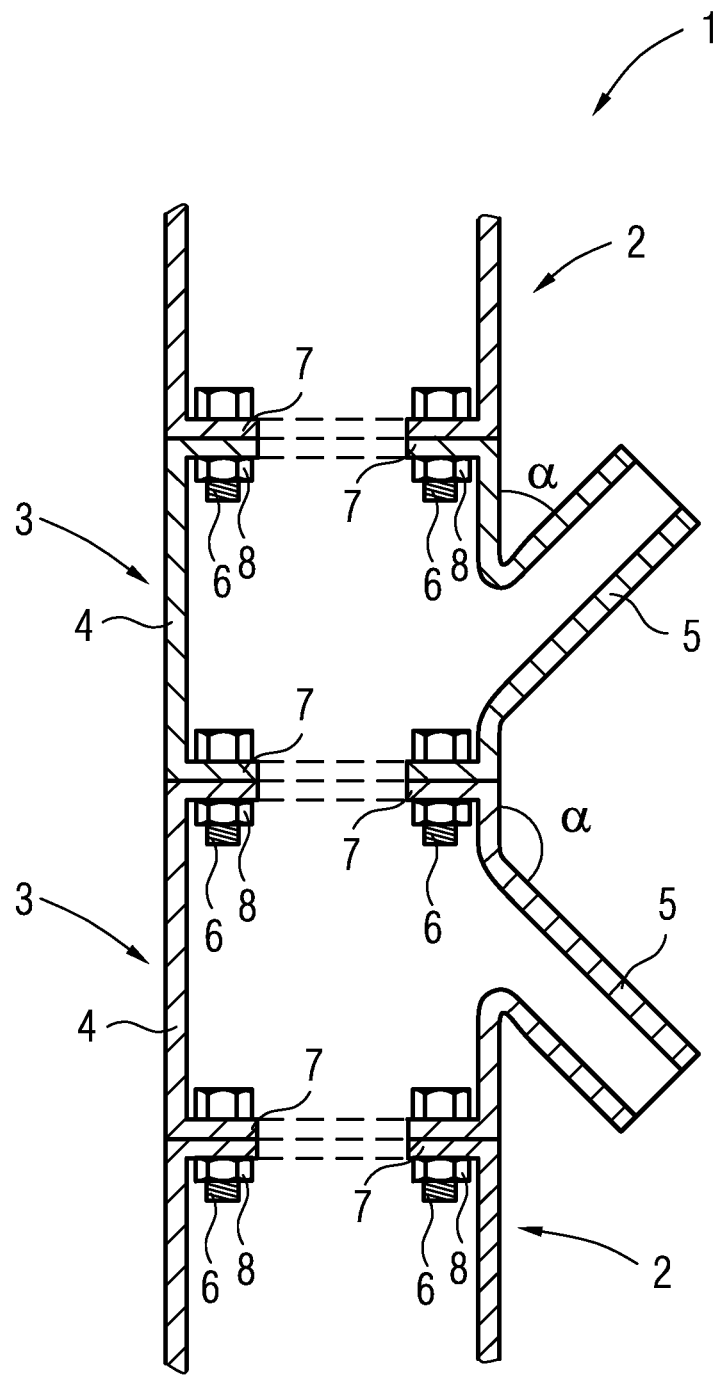
FIG. 5 shows a principle cut-out view of an inventive jacket structure according to a fifth exemplary embodiment of the invention.

FIG. 5 shows a principle cut-out view of an inventive jacket structure 1 according to a fifth exemplary embodiment of the invention. On the basis of the arrangement of the jacket structure 1 according to FIG. 5 it is discernible that a number of different possible arrangements of profiles 2 and connecting members 3 is inventively feasible which means in turn, that the inventive jacket structure offers a large degree of constructive flexibility.

As is discernible from FIG. 5, the jacket structure 1 comprises a stack of axially aligned profiles 2 and connecting members 3, whereby two adjacently disposed connecting members 3 are disposed in between two profiles 2, that is are connected there in between the axial profiles 2 with each other and the respective profiles 2 by means of the inventive bolted-connection. Of course, other arrangements are applicable as well, that is the arrangement of successive profiles 2 and/or connecting members 3 is not limited.

The inventive jacket structure 1 offers a plurality of advantages in particular in comparison to jacket structures with welded-joints as known from prior art. The advantages mainly refer to the field of planning and realising the erection of respective jacket structures 1 which favourably serve as a foundation for offshore wind turbines.

The invention claimed is:

1. A jacket structure for offshore wind turbine, comprising:
a plurality of profiles in axial or angled alignment and a plurality of connecting members; whereby a connection of the plurality of profiles or the plurality of connecting members is established by means of a bolted-connection;
wherein a first profile and first connecting member comprise a first connecting portion for connecting with a second profile or second connecting member;
wherein the bolted-connection is provided by bolts penetrating through at least two adjacently disposed connecting portions of the plurality of profiles or the plurality of connecting members, whereby the free endings of the bolts are fixed by respective locking means; and
wherein a bolt penetrates from a first connecting portion of a first profile or first connecting member through a second connecting portion of a second profile or second connecting member disposed downstream to a third connecting portion of a third profile or connecting member.

2. The jacket structure according to claim 1, wherein a first profile is connected to a second profile or second connecting member.

3. The jacket structure according to claim 1, wherein a first connecting member is connected to a first profile in axial alignment or a second profile in an angled alignment or a second connecting member.

4. The jacket structure according to claim 1, wherein the first connecting portion is provided at respective free endings of the first profile and the first connecting member.

5. The jacket structure according to claim 4, wherein the free endings of the first profile are disposed in axial alignment and the free endings of the first connecting member are disposed in axial and angled alignment.

6. The jacket structure according to claim 1, wherein the free endings of the first profile are disposed in axial alignment and the free endings of the first connecting member are disposed in axial and angled alignment.

7. The jacket structure according to claim 1, wherein the bolt is at least partially enclosed by a sleeve.

8. The jacket structure according to claim 1, wherein the first connecting portion is provided by at least one radially inwardly or outwardly extending flange.

9. The jacket structure according to claim 8, wherein each flange comprises at least one bore through which a bolt may penetrate.

10. The jacket structure according to claim 1, wherein the first profile or the first connecting member is at least partially hollow.

11. The jacket structure according to claim 1, wherein the first profile or the first connecting member has a round or elliptical cross-section.

12. The jacket structure according to claim 1, wherein the first profile has the same or a different cross-section than the first connecting member.

13. A wind turbine comprising a jacket structure according to claim 1.

* * * * *